United States Patent [19]
Martucci

[11] Patent Number: 5,297,675
[45] Date of Patent: Mar. 29, 1994

[54] STORAGE TRAY FOR AUDIO/VIDEO CASSETTE AND GAME CARTRIDGES

[76] Inventor: Thomas Martucci, 701 Richmond Ave., Point Pleasant Beach, N.J. 08742

[21] Appl. No.: 844,766

[22] Filed: Mar. 2, 1992

[51] Int. Cl.⁵ ............... B65D 85/57; B65D 85/672
[52] U.S. Cl. .................... 206/309; 206/387; 211/40; 312/9.54
[58] Field of Search ............ 206/387, 309; 211/40, 211/41; 312/9.54, 9.53

[56] References Cited

U.S. PATENT DOCUMENTS

| | | | |
|---|---|---|---|
| 3,756,383 | 9/1973 | Kryter | 206/387 |
| 4,040,518 | 8/1977 | Carter | 206/387 |
| 4,744,463 | 5/1988 | Merzon | 206/387 |
| 4,779,730 | 10/1988 | Hartsfield et al. | 206/387 |
| 4,782,949 | 11/1988 | Berkman | 206/387 |
| 4,819,801 | 4/1989 | Howard | 206/387 |
| 4,896,769 | 1/1990 | Merzon | 206/387 X |
| 5,103,986 | 4/1992 | Marlowe | 211/41 |

Primary Examiner—Bryon P. Gehman
Attorney, Agent, or Firm—Clifford G. Frayne

[57] ABSTRACT

A storage tray for boxed or unboxed audio cassettes, video cassettes and game cartridges, and compact discs and floppy discs in which the cassette, cartridge or disc is frictionally engaged within one of a plurality of cassette-receiving compartments formed in the storage tray, the cassette, cartridge or disc being secured frictionally by means of a plurality of resilient engagement fingers formed in one wall of the storage tray, the resilient fingers engaging one end wall of the cassette, cartridge or disc, the opposing end wall being frictionally engaged by the opposing rear wall of the storage tray.

10 Claims, 7 Drawing Sheets

STORAGE TRAY FOR AUDIO/VIDEO CASSETTE AND GAME CARTRIDGES

FIELD OF INVENTION

This invention relates to a storage tray for securing audio and video cassette game cartridges; compact discs.

BACKGROUND OF THE INVENTION

The present invention is related to a storage tray which allows the storing of audio cassettes, video cassettes, game cartridges, and compact disc and floppy discss. The dimensions of the storage tray vary with respect to the type of cassette to be stored, however, the storage trays have a common, novel structural element in that they are capable of storing the particular cassette or cartridge in either its boxed or unboxed mode and the cassette or tape or disc is frictionally engaged within the storage tray of the cassette or disc, either boxed or unboxed on opposing end panels.

There have been previous attempts to develop a storage tray adaptable to storing cassettes of multiple sizes in either their boxed or unboxed mode. These attempts include the following patents: U.S. Pat. No. 4,705,169 to Mastronardo; U.S. Pat. No. 4,411,481 to Berkman; U.S. Pat. No. 4,117,931 to Berkman; U.S. Pat. No. 3,756,383 to Kryter; U.S. Pat. No. 4,231,473 to Aprahamian; U.S. Pat. No. 3,603,478 to Connau; and U.S. Pat. No. 4,960,205 to Wang.

All of the aforesaid patents, in one form or another, attempt to accomplish the storage of various size cassettes in either the boxed or unboxed mode and to secure the cassettes within the storage container tray such that they cannot be dislodged. However, the structures disclosed in the aforesaid patents have not been successful in maintaining the cassettes in a secure manner to prevent dislodgement. The tray structure disclosed in the prior art cannot lock in a cassette unless the tray is full and the prior art structure cannot accommodate cassettes of varying size. The securing means utilized in the prior art patents is subject to wear and tear such that it cannot maintain the cassettes in a secure manner over time and in most instances the securing means utilized in the prior art patents is a passive securing means whereas Applicant has developed a novel structure having an active securing means which acts positively on the cassettes, cartridge or disc in the boxed or unboxed mode in order to secure the cassette, cartridge or disc within the storage tray repeatedly and which will not deteriorate over time. The terms audio cassette, video cassette or cassette as used hereafter is meant to include game cartridges, compact discs and floppy discs except where specific structural limitations are identified.

OBJECTS OF THE INVENTION

It is a principal object of the present invention to provide for a novel storage tray for audio, video cassettes, game cartridges or discs in which the cassettes are actively secured within the tray.

It is a further object of the present invention to provide for a novel storage tray for audio and video cassettes in which the cassette is secured on its opposing end panels.

It is a still further object of the present invention to provide for a novel storage tray for audio and video cassettes which permits the cassettes to be secured within the tray in either a boxed or unboxed mode.

It is a still further object of the present invention to provide for a novel storage tray for audio and video cassettes which permits the securing of cassettes of varying sizes within the storage tray.

SUMMARY OF THE INVENTION

The present invention is directed towards a novel storage tray for securing audio and video cassettes, the storage tray positionable within a carrying case such as an attache-style case or fabric carry-all, the storage tray having a plurality of internal rib dividers defining a plurality of cells within the storage tray for receipt of the audio or video cassettes in either a boxed or unboxed mode, the cassettes being secured by means of a plurality of flexible inwardly depending fingers which engage one end panel of the audio or video cassette, the other end panel of the audio video cassette being engaged by the opposing sidewall, the flexible finger being slightly displaced, exerts positive pressure on one end panel of the cassette, thus maintaining the cassette in a secure mode within the storage tray.

BRIEF DESCRIPTION OF THE DRAWINGS

These and other objects of the present invention will become more evident when taken in light of the following drawings wherein.

DETAILED DESCRIPTION OF THE DRAWINGS

Figure 1:
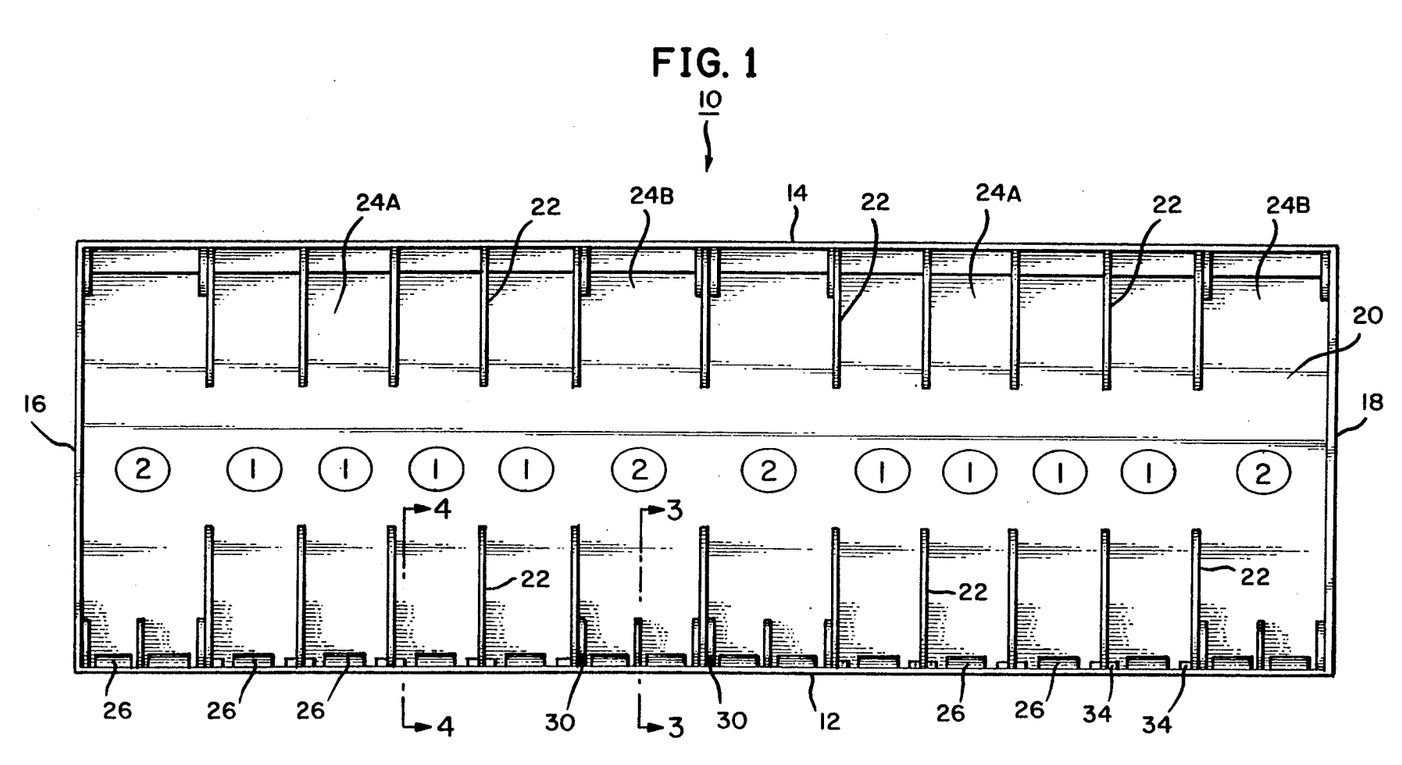
FIG. 1 is a top view of the storage tray.

Referring to FIG. 1, there is illustrated a top view of storage tray 10. Storage tray 10 comprises a front wall 12, a rear wall 14, and sidewalls 16 and 18 and a base 20.

Extending inwardly from front wall 12 and rear wall 14 are a plurality of dividers 22. Dividers 22 extending inwardly from front wall 12 are in alignment with dividers 22 extending inwardly from rear wall 14 and thus define a plurality of cassette receiving cells 24A and 24B. As can be seen in FIG. 1, the distance between dividers along front wall 12 and along rear wall 14 may vary such that two different size cells 24A and 24B may be formed. The reasoning and practicality for having different size cells 24A and 24B will be discussed hereafter.

Positioned in front wall 12 are a plurality of inwardly-depending engagement fingers 26. Each cassette cell 24A has one engagement finger 26 associated with it and each cassette cell 24B has two engagement fingers 26 associated with it. Engagement finger 26 is more readily discernible with reference to FIG. 2 which is a front view of the storage tray 10 and FIGS. 3, 4 and 5 which are partial cutaway views of the storage tray 10 and a side view of engagement finger 26, respectively.

Figure 2:
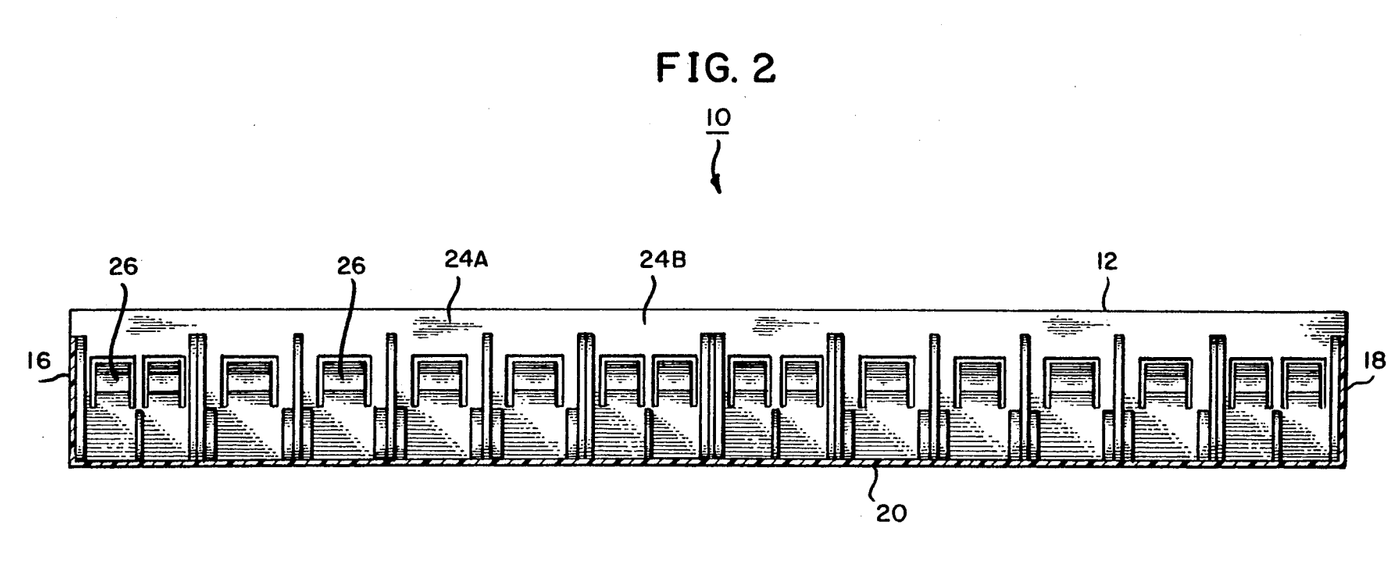
FIG. 2 is a front view of the storage tray.

FIG. 2 illustrates the positioning of engagement fingers 26 in front wall 12 of storage tray 10 and their relative positioning on the front wall 12 of storage tray 10 vis-a-vis the height of storage tray 10. There is an engagement finger 26 positioned between each divider with respect to cassette cells 24A and two engagement fingers 26 positioned between dividers with respect to cassette cells 24B.

Figure 3:
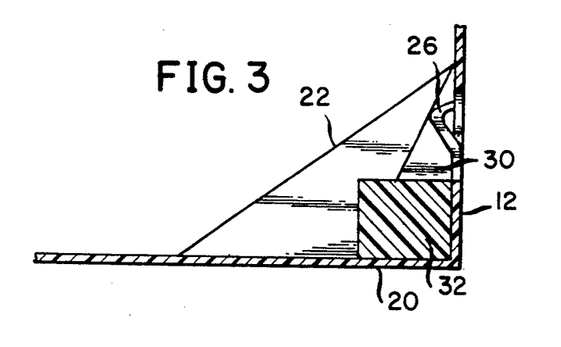
FIG. 3 is a sectional view of one type of cell along plane 3—3 of FIG. 1.

FIG. 3 is a partial cross sectional view of storage tray 10 along plane 3—3 of FIG. 1 which illustrates cassette cell 24B. Engagement finger 26 extends inwardly from front wall 12. Divider 22 extends inwardly from front wall 12 and is secured to front wall 12 and base 20. As illustrated in FIG. 3, divider 22 is triangular in shape. Adjacent to divider 22, interiorly positioned in cell 24B is a support divider 30 which is secured to front wall 12 and base 20. Since cassette cell 24B has two engagement fingers associated with it, a rib divider 32 secured to front wall 12 and base 20 is positioned between the two engagement fingers. The positioning of rib divider 32 may be better understood with reference to FIG. 1 illustrating its equidistant positioning between dividers 22 of cassette cell 24B.

Figure 4:
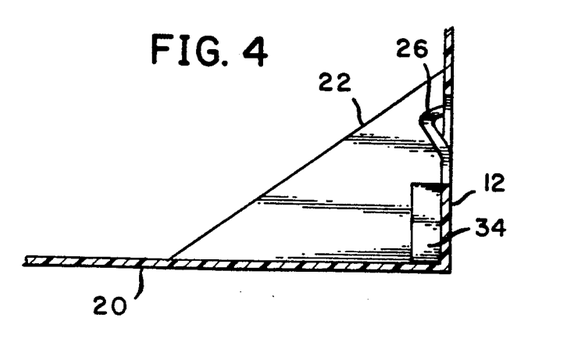
FIG. 4 is a sectional view of a second type of cell along plane 4—4 of FIG. 1.

FIG. 4 is a partial cross sectional view of storage tray 10 along plane 4—4 of FIG. 1 which illustrates cassette cell 24A. Cell 24A has only one engagement finger 26 associated therewith. Again, there is a divider 22 identical to that found in cell 24B. There is no support divider of a triangular shape associated with cell 24A. Rather, there is a rib support 34 positioned in cell 24A which is located at the intersection of divider 22, base 20 and front wall 12. There are two supports 34 associated with each cassette cell 24A as can be readily seen with reference back to FIG. 1.

Figure 5:
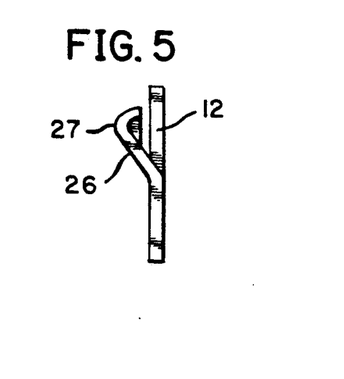
FIG. 5 is a cutaway side view of the securing means.

FIG. 5 is a cross sectional view illustrating engagement finger 26. Engagement finger 26 is an integral part of front wall 12 and is formed in the molding process as will be discussed hereafter. Engagement finger 26 extends inwardly into storage tray 10 and is resiliently flexible such that it can be displaced slightly outwardly from the interior of the storage tray 10 by positioning a cassette in a respective cassette cell. Arcuate end 27 of finger 26 is designed to engage the lateral sidewall of the cassette so as to frictionally maintain the cassette in a secure position within the storage tray 10.

Figure 6:
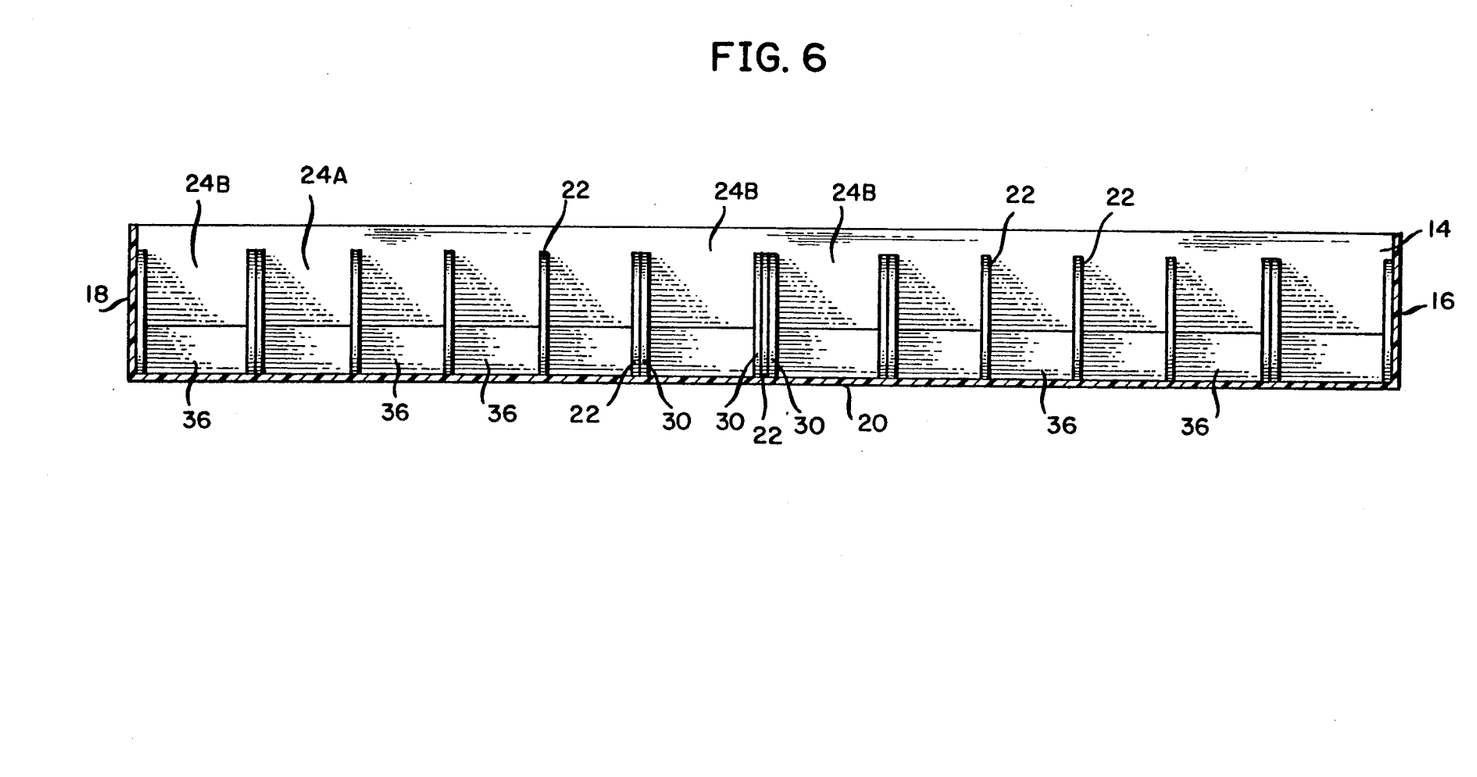
FIG. 6 is a rear view of the storage tray.

FIG. 6 is a rear view of the storage tray 10. This illustrates dividers 22 which depend inwardly from rear wall 14. Positioned on the rear wall 14 of cassette cell 24A is a stepped support 36 which extends between dividers 22 and is positioned at the intersection of rear wall 14 and base 20. A similar stepped support 36 is also positioned within cassette cells 24B and is positioned between support dividers 30.

Figure 1A:
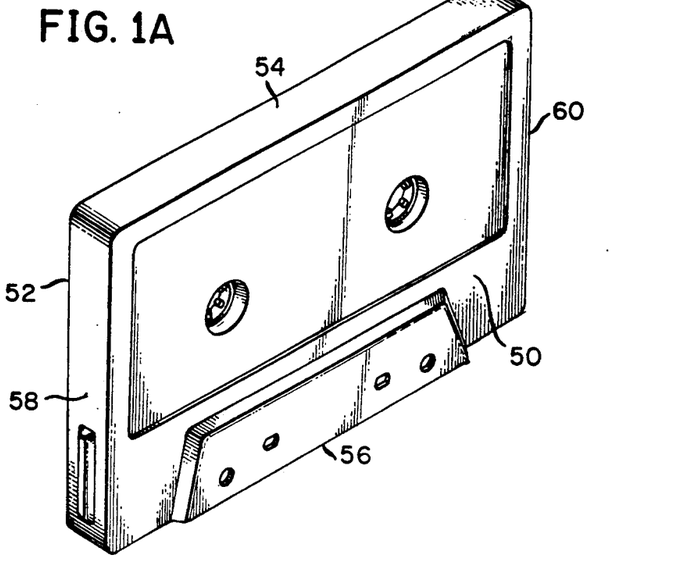
FIG. 1A is a perspective view of a typical cassette.

The storage and securing of a cassette within storage tray 10 may best be understood with reference to FIG. 1 and 1A which is a perspective view of a typical cassette having a front panel 50, rear panel 52, side panels 54 and 56 and end panels 58 and 60. An unboxed cassette can be secured within storage tray 10 by positioning a cassette in cassette cell 24a with the open portion, side panels 54, of the cassette facing downwardly and pressing the cassette into cassette cell 24A between dividers 22. One end panel 60 of the cassette will engage rib support 36 and the other lateral edge of the cassette will engage engagement finger 26 and slightly displace finger 26 outwardly to allow the cassette to be positioned within cassette cell 24A such that side panel 54 is in proximate contact with base 20. A cassette is thus frictionally engaged on its end panels 58 and 60 by support 36 and engagement finger 26. The unboxed cassette could similarly be positioned in cassette cell 24B, cassette cell 24B being capable of accommodating two unboxed cassettes.

A boxed cassette would be positioned similarly as to an unboxed cassette; however, to accommodate slight variations in length, the boxed cassette may not engage base 20, but rather rest on supports 36 and 34. In this configuration, the end panels of the cassette are frictionally engaged by rear wall 14 and engagement finger 26 to ensure that the cassette does not become dislodged. Boxed cassettes would be stored primarily within cassette cell 24A of storage tray 10.

Storage tray 10 as disclosed in FIGS. 1 through 6 would be appropriately dimensioned to accommodate either audio cassettes in a boxed or unboxed mode, video cassettes in a boxed or unboxed mode, or compact disks. FIGS. 7 through 10 illustrate a second embodiment of a storage tray designed to accommodate game cartridges or floppy computer disks of the common 3½ inch sizes.

Figure 7:
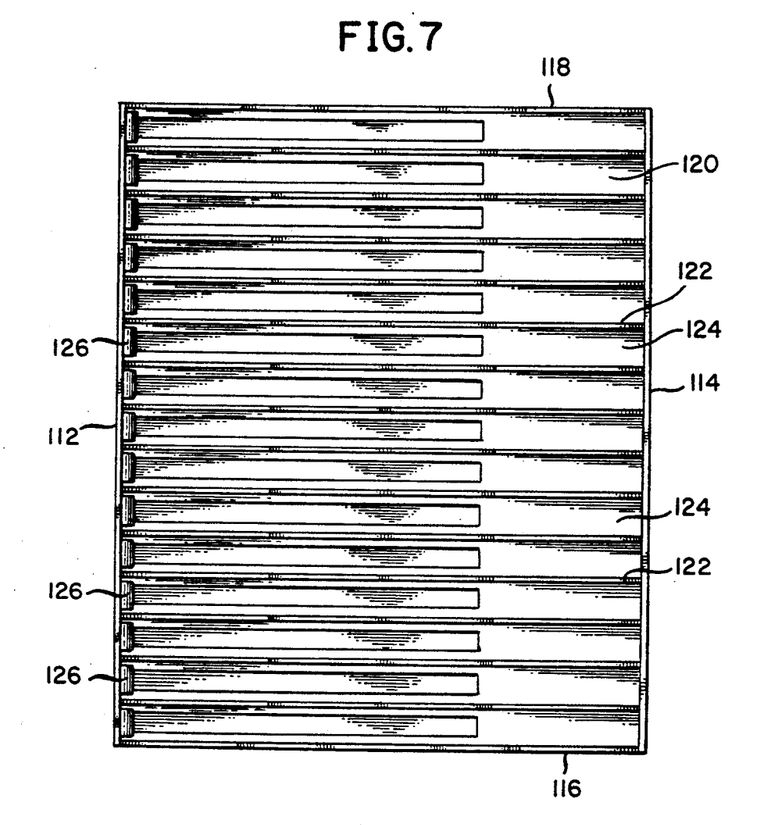
FIG. 7 is a top view of a second embodiment of the storage tray having specific application to compact disks and computer disks.

FIG. 7 is a top view of a second embodiment of a storage tray 100 having a front wall 112, a rear wall 114, end walls 116 and 118, and a base 120. Storage tray 100 is comprised of a series of cassette cells 124 which are defined by a plurality of dividers 122 which extend from front wall 112 to rear wall 114. In this configuration of storage tray 100, all of the cassette cells 124 are of equal size. Again, positioned on front wall 112, are a plurality of engagement fingers 126 which depends inwardly from front wall 112 into cassette cell 124. There is one engagement finger 126 associated with each cassette cell 124.

Figure 8:
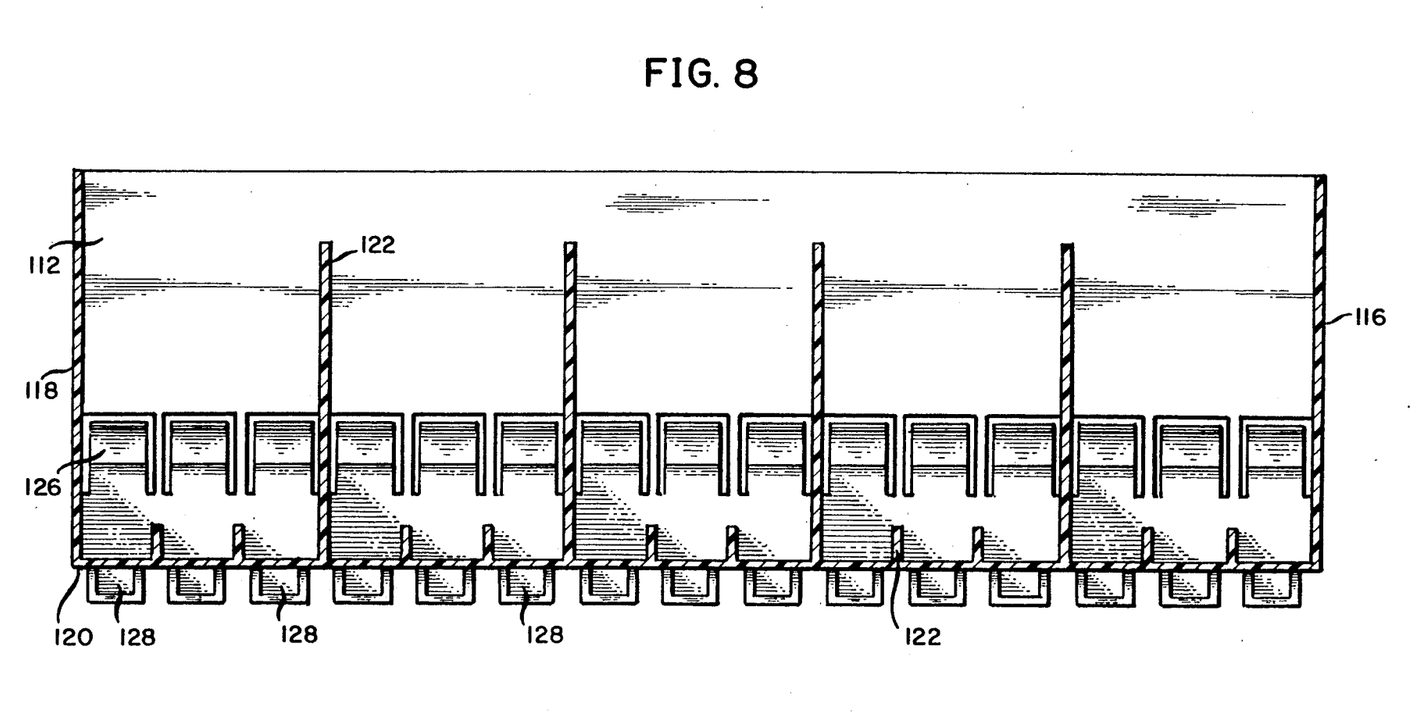
FIG. 8 is a front view of the storage tray of the second embodiment.

Referring to FIG. 8, there is illustrated a front view of storage tray 100. FIG. 8 illustrates that every third divider 122 is somewhat higher than the previous two dividers so as to group cassette cells 124 into groups of three (3). This is primarily done in order to maintain the structural integrity of the storage tray 100 which would be made of one-piece molded plastic material and the choice of every third divider 122 for enlargement is one of choice and not necessity.

Base 120 of storage tray 100 has formed therein, in each of cassette cells 124, a depending slot 128 which extends a prescribed distance from front wall 112 towards rear wall 114 in base 120. The prescribed distance of slot 128 is one of choice depending upon what type and size of disc one wishes to store in the manufactured tray.

As an example, the distance between front wall 112 and rear wall 114 of storage tray 100 could be dimensioned such that video game cassettes could be stored in each cassette cell 124 by positioning the cassette in cassette cell 124 and pressing downwardly such that the end panels of the cassette were frictionally engaged with the interior of rear wall 114 and engaging finger 126 in the front wall 112 of storage tray 100. Simultaneously, a smaller cassette or disc such as a 3½ inch floppy disc for a computer could be stored in storage tray 100 by positioning the 3½ inch cassette in depending slot 128 of a particular cassette cell 124 and pressing downwardly. The disc would be engaged by engagement finger 126 and corner 130 of depending slot 128 formed by the intersection of slot 128 and base 120. Corner 130 would engage one end panel corner of the disc so as to maintain the disc in a secured position within storage tray 100.

Figure 9:
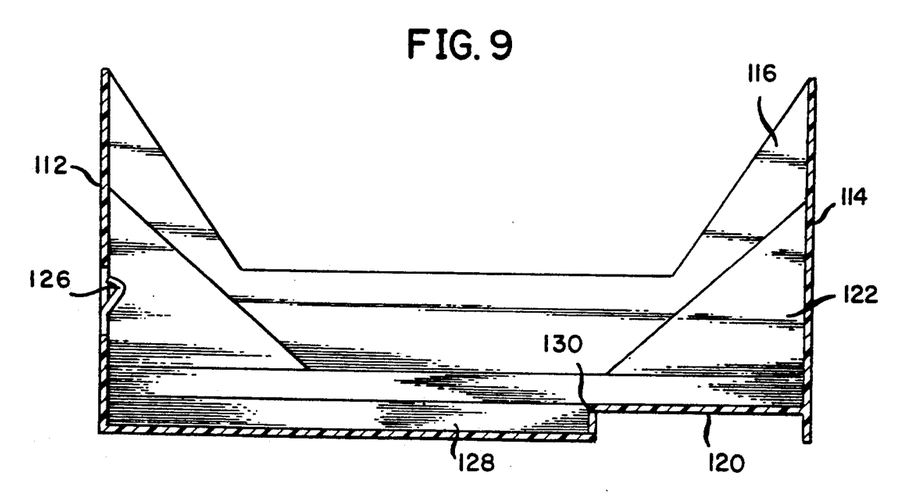
FIG. 9 is a side view along plane 7 of FIG. 7 of the storage tray of the second embodiment.
Figure 10:
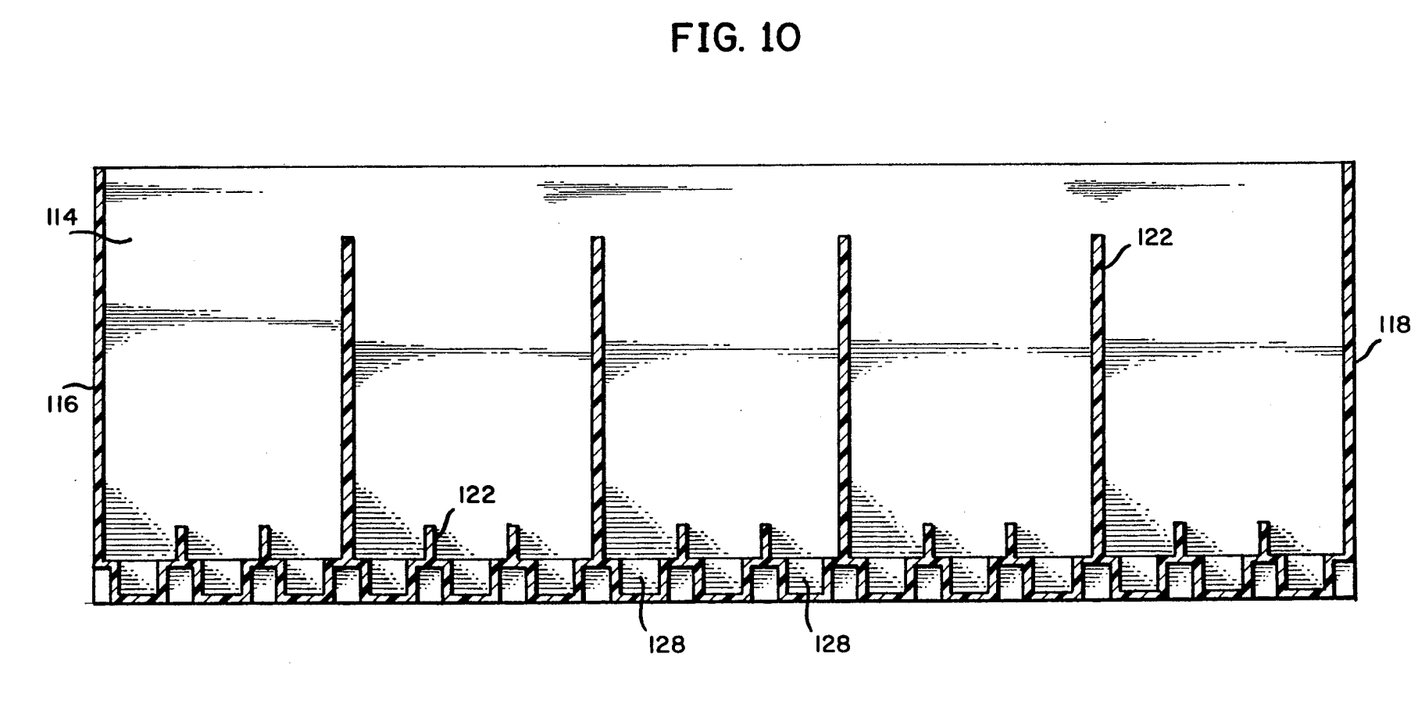
FIG. 10 is a rear view of a storage tray of the second embodiment.

FIG. 9 is an end view of storage tray 100 showing the relationship of depending slot 128 to base 120 and thus defining corner 130 for engagement with cassettes or floppy discs of the 3½ inch variety. FIG. 10 is a rear view of storage tray 100 again showing the relationship of depending slots 128 to base 120.

The first embodiment of the storage tray as disclosed in FIGS. 1 through 6 and the second embodiment of the storage tray as disclosed in FIGS. 7 through 10 would normally be manufactured of one-piece molded plastic. As previously stated, the size and dimension of the storage tray would be varied in accordance with the dimensions of the audio cassette, video cassette, game cartridge, compact disc or floppy disc which the user wished to store. As an example, the embodiment disclosed in FIG. 1 could be dimensioned for boxed or unboxed audio cassettes. The length of sidewalls 16 and 18 and the width of cassette cells 24A and 24B could be increased so as to provide for storage tray which would accommodate boxed or unboxed video cassettes. Similarly, these dimensions could be modified to accommodate game cartridges or compact discs. The second embodiment of the storage tray as illustrated in FIG. 7 accommodates 3½ inch floppy discs in combination with compact discs.

In either embodiment, the essential feature is that the cassette, no matter which type, is actively engaged in a secure position by frictional engagement on a portion of the end panels of the cassette, the frictional engagement being accomplished by resilient finger 26 or 126 as found in the front wall of the two embodiments in combination with the rear wall or support adjacent the rear wall of either embodiment. The resiliency of fingers 26 and 126 is such that once the cassette is engaged in the particular cassette cell, the storage tray itself can be rotated 360° without any dislodgement or loosening of the cassette from the storage tray.

Typically, storage trays of the type disclosed and illustrated herein are made of one-piece molded plastic and then positioned within a carrying case, the carrying case being typically a zippered bag constructed of nylon or canvas. The user is desirous of ensuring that the cassettes which he or she has engaged in the storage tray will not become dislodged through the handling of the carrying case. Applicant's novel incorporation of the resilient fingering in cooperation with the rear wall structure of his storage cases ensures that the cassette is frictionally engaged under positive force on the cassette's end panels to ensure that the cassette is not dislodged from the storage tray.

While the invention has been described with reference to the preferred embodiment thereof, it will be appreciated by those of ordinary skill in the art that various changes can be made without departing from the basic spirit and scope of the invention.

I claim:

1. A storage tray having a plurality of compartments for storing a plurality of boxed or unboxed audio cassettes, boxed or unboxed video cassettes and game cartridges, wherein said cassettes or cartridges, in boxed or unboxed form, are defined by a front panel and a rear panel in parallel relationship with each other, parallel side panels and parallel end panels, said storage tray comprising:

a front wall and a rear wall in parallel relationship with each other, parallel opposing sidewalls, and a base secured to said front wall, rear wall and sidewalls;

a first plurality of dividers secured to said front wall and said base, and a second plurality of dividers secured to said rear wall and said base, said first plurality of dividers aligned with said second plurality of dividers thereby defining a plurality of compartments within said storage tray;

a first support surface positioned and extending between said second plurality of dividers, said first support surface defining a horizontal, elevated step from said base of said storage tray on said rear wall;

a second support surface positioned adjacent said first plurality of dividers on said front wall, said second support surface positioned at the intersection of said first plurality of dividers and said front wall;

a resilient engagement member associated with each compartment, each said resilient engagement member formed in said front wall of said storage tray, each said resilient engagement member positioned between said first plurality of dividers and depending inwardly from said front wall, each said resilient engagement member being displaceable outwardly, towards said front wall upon insertion of a boxed or unboxed cassette into a said compartment, each said resilient engagement member being displaced outwardly upon engagement with one of said side panels of an inserted boxed or unboxed cassette, the opposing side panel of said boxed or unboxed cassette to engage with said first support surface extending between said second plurality of dividers on said rear wall of said storage tray.

2. A storage tray in accordance with claim 1 wherein said first plurality of dividers and second second plurality of dividers are spaced apart to define a plurality of cassette-receiving compartments capable of securing one or more of said boxed or unboxed cassettes in parallel relationship with each other.

3. A storage tray in accordance with claim 1 wherein said front wall has a said resilient engagement member positioned therein for cooperation with a side panel of each cassette positioned in each of said compartments.

4. A storage tray in accordance with claim 1 wherein each of said resilient engagement members comprises an arcuate finger-shaped member having a first end secured to said front wall so as to form an inwardly-depending finger surface for engagement with the side panel of a boxed or unboxed cassette, said arcuate finger-shaped member being displaceable outwardly towards said front wall upon frictional engagement with said side panel of a boxed or unboxed cassette simultaneous with the frictional engagement of said opposing side panel of said boxed or unboxed cassette with said rear wall or said first support means on said rear wall.

5. A storage tray in accordance with claim 1 wherein said first support surface and said second support surface each define an elevated step of equal height along said rear wall and said front wall, respectively, to accommodate said boxed or unboxed cassettes of varying side panel lengths, a said unboxed cassette would engage said resilient engagement member along one of its side panels, the opposing side panel would engage said first support surface; a said boxed cassette having a said side panel that would engage said resilient engagement member and the opposing second side panel would frictionally engage said rear wall of said storage tray, one said end panel of a said boxed cassette supported on said first and second support surfaces.

6. A storage tray in accordance with claim 1 wherein the distance between said front wall and said rear wall of said storage tray and the distance between each of said first plurality of dividers and each of said second plurality of dividers is selectively determined to permit said storage tray to receive and secure audio cassettes.

7. A storage tray in accordance with claim 1 wherein the distance between said front wall and said rear wall of said storage tray and the distance between each of said first plurality of dividers and each of said second plurality of dividers is selectively determined to permit said storage tray to receive and secure video cassettes.

8. A storage tray in accordance with claim 1 wherein the distance between said front wall and said rear wall of said storage tray and the distance between each of said first plurality of dividers and each of said second plurality of dividers is selectively determined to permit said storage tray to receive and secure game cartridges.

9. A storage tray for storing boxed or unboxed compact or floppy discs, each of said compact or floppy disc defined by a front panel, rear panel, parallel side panels and parallel end panels, said storage tray comprising:
- a front wall and a rear wall in parallel relationship with each other, parallel opposing sidewalls, and a base secured to said front wall, rear wall and sidewalls;
- a first plurality of dividers secured to said front wall and said base and a second plurality of dividers secured to said rear wall and said base, said first plurality of dividers aligned with said second plurality of dividers thereby defining a plurality of disc-receiving compartments;
- a recessed channel formed in said base of said storage tray in each of said disc-receiving compartments, each said recessed channel having a first end coincidental with said front wall of said storage tray, each said recessed channel extending from said front wall towards said rear wall a distance equal to a length of an end panel of a floppy disc, each said recessed channel terminating in a second end formed in said base of said storage tray; and
- a resilient engagement member associated with each disc-receiving compartment, each said resilient engagement member formed in said front wall of said storage tray, each said resilient engagement member positioned between said first plurality of dividers and depending inwardly from said front wall, each said resilient engagement member being displaceable outwardly towards said front wall upon insertion of a disc into a disc-receiving compartment, an opposing end panel of an inserted compact disc frictionally engaging said rear wall of said storage tray thereby frictionally securing said inserted compact disc in a disc-receiving compartment of said storage tray, an opposing end panel of an inserted floppy disc engaging said second end of said recessed channel and a side panel of said inserted floppy disc engaging said base of said recessed channel thereby frictionally securing said inserted floppy disc in a recessed channel of a disc-receiving compartment of said storage tray.

10. The storage tray in accordance with claim 9 wherein each resilient engagement member comprises an arcuate finger-shaped member having a first end formed in said front wall of said storage tray, each said arcuate finger-shaped member depending inwardly for engagement with an end panel of an inserted disc, each said arcuate finger-shaped member being displaceable outwardly towards said front wall upon frictional engagement with said end panel of an inserted disc simultaneously with frictional engagement of an opposing end panel of a compact disc with said rear wall of said storage tray or simultaneously with frictional engagement of an opposing end panel of a floppy disc with said second end of said recessed channel.

* * * * *